United States Patent
Le Mire

(10) Patent No.: US 6,940,397 B1
(45) Date of Patent: Sep. 6, 2005

(54) VEHICLE SURVEILLANCE SYSTEM

(76) Inventor: Benjamin E Le Mire, 2660 Eastlake Dr. SE., Salem, OR (US) 97306

( * ) Notice: Subject to any disclaimer, the term of this patent is extended or adjusted under 35 U.S.C. 154(b) by 12 days.

(21) Appl. No.: 10/383,417

(22) Filed: Mar. 7, 2003

(51) Int. Cl.[7] .............................................. B60R 25/10
(52) U.S. Cl. .............................. 340/426.1; 340/426.11; 340/426.26; 348/148; 180/287; 307/10.2
(58) Field of Search ........................ 340/426.1, 426.11, 340/426.13, 426.14, 426.16, 426.17, 426.18, 340/426.19, 426.2, 426.27, 426.3, 426.35, 340/440, 426.26; 348/148, 143, 138; 180/287; 307/10.2, 10.6

(56) References Cited

U.S. PATENT DOCUMENTS

| | | | | | |
|---|---|---|---|---|---|
| 4,655,057 | A | * | 4/1987 | Derman | ........................... 70/14 |
| 4,977,762 | A | * | 12/1990 | Dennis | ........................... 70/14 |
| 5,381,128 | A | * | 1/1995 | Kaplan | ................... 340/426.17 |
| 5,905,431 | A | * | 5/1999 | Mueller et al. | ......... 340/426.17 |
| 6,002,326 | A | * | 12/1999 | Turner | ...................... 340/426.1 |
| 6,154,658 | A | * | 11/2000 | Caci | ........................... 455/466 |
| RE37,011 | E | * | 1/2001 | Dawson et al. | ............. 235/382 |
| 6,275,773 | B1 | * | 8/2001 | Lemelson et al. | ........... 701/301 |
| 6,525,653 | B1 | * | 2/2003 | Rigmaiden | ............... 340/426.1 |
| 6,675,006 | B1 | * | 1/2004 | Diaz et al. | ................ 455/404.1 |
| 6,741,165 | B1 | * | 5/2004 | Langfahl et al. | ......... 340/426.1 |

* cited by examiner

*Primary Examiner*—Davetta W. Goins
(74) *Attorney, Agent, or Firm*—Risto A. Rinne, Jr.

(57) ABSTRACT

An apparatus for the recording of images from an interior of a vehicle upon detection of an intrusion allows for the arming of the vehicle when it is not in use. A locking of the vehicle's doors, a shutting off of the engine, or other methods are used to detect when the system is to be armed. The system does not record images when it is armed. It must be armed and then an intrusion must occur. Intrusion is detected by a dome light illuminating, a door lock being opened from the inside, a motion sensor detecting a presence or by other methods. When intrusion occurs with an armed system, recording of the images in the vehicle discreetly occurs.

20 Claims, 4 Drawing Sheets

VEHICLE SURVEILLANCE SYSTEM

BACKGROUND OF THE INVENTION

1. Field of the Invention

The present invention, in general relates to security systems and, more particularly, to a vehicular surveillance system that is adapted to video tape the interior of a vehicle upon detection of an intrusion.

Vehicular intrusion alarms are well known. It is all too common to hear an automobile alarm sounding in both urban and rural areas. These alarm indications have become so common that they are generally ignored by practically everyone except perhaps the owner of the vehicle. Often, it is the owner who has in fact inadvertently activated the alarm by opening a door before deactivating the alarm or by accidentally pressing a "panic" button on a remote car door opening device. Regardless of whether the alarm is triggered accidentally or in response to detecting an unauthorized entry, for example a break-in, people tend to ignore automobile alarms, thereby defeating their efficacy at detecting and deterring theft.

This theft may be of the vehicle or of the contents that are disposed in the vehicle, for example articles left in the interior of the vehicle or stereo equipment.

It is difficult to catch car thieves in general. Law enforcement personnel do not generally have the resources to elevate the theft of a car stereo or the contents that are left in a vehicle and stolen to a high enough priority to devote resources to both recovery and prosecution. Often, there are no witnesses to the crime or no way to identify the contents that are stolen and associate them with the rightful owner.

Because these types of crimes are not usually violent or regarded as being as serious as other crimes, forensic resources are also usually limited. We do not typically hear of law enforcement personnel obtaining DNA and other sophisticated types of forensic evidence after a stolen vehicle has been recovered or after a purse has been stolen from inside of a vehicle. Therefore, the apprehension rate for suspects for such types of crimes is low and the prosecution and conviction rates are even lower.

It is desirable to provide an acceptable record of an intrusion that is useful in identifying an intruder of an automobile and which documents his actions sufficient to result in arrest and prosecution and which can also be used to identify stolen property.

Video recording equipment inside a vehicle is known for use by law enforcement personnel to look forward of a police vehicle (i.e., out the front window) and to video tape the actions of police and those whom they encounter. Such equipment is always videotaping events whenever the police vehicle is in use.

This is not practical for individual surveillance to detect when an intrusion occurs as it would be both impractical as well as cost prohibitive to attempt to videotape constantly.

Furthermore, it is desirable to videotape not only an instrument cluster area of the vehicle, but to videotape a larger section of the vehicle's interior and front or dash area. It is also desirable to hide the camera and recorder from sight so that an intruder does not know if he or she is being videotaped. If such equipment were available, it would deter theft of both automobiles and their contents.

Accordingly, there exists today a need for a vehicle surveillance system that helps to ameliorate the above described problems.

Clearly, such an apparatus would be a useful and desirable device.

2. Description of Prior Art

Vehicle security and surveillance systems are, in general, known. For example, the following patents describe various types of these devices:

U.S. Pat. No. 4,949,186 to Peterson, Aug. 14, 1990;
U.S. Pat. No. 3,885,090 to Rosenbaum, May, 1975;
U.S. Pat. No. 4,214,265 to Olesen, July, 1980;
U.S. Pat. No. 4,630,110 to Cotton et al, December, 1986; and
U.S. Pat. No. 6,433,683 to Robinson, Aug. 13, 2002.

While the structural arrangements of the above described devices and many other patents not cited, at first appearance, may have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a vehicle surveillance system that is adapted to provide a video recording of an interior of a vehicle upon detection of an unauthorized entry into the vehicle.

It is also an important object of the invention to provide a vehicle surveillance system that is armed upon manual (key) locking of the vehicle's doors and disarmed upon manual unlocking the doors.

Another object of the invention is to provide a vehicle surveillance system that is armed upon remote locking of the vehicle's doors and disarmed upon manual (key) unlocking the doors.

Still another object of the invention is to provide a vehicle surveillance system that is armed upon remote locking of the vehicle's doors and disarmed upon remote unlocking the doors.

Still yet another object of the invention is to provide a vehicle surveillance system that is armed upon manual (key) locking of the vehicle's doors and disarmed upon remote unlocking the doors.

Yet another important object of the invention is to provide a vehicle surveillance system that is armed a predetermined time after closing of a door of the vehicle.

Yet one continuing object of the invention is to provide a vehicle surveillance system that is armed a predetermined time after the ignition key is switched to the off position.

Still yet another important object of the invention is to provide a vehicle surveillance system that begins video recording of an interior of a vehicle when the system is armed upon detection of an intrusion by the use of a sensor.

A first remaining important object of the invention is to provide a vehicle surveillance system that begins video recording of an interior of a vehicle when the system is armed upon detection of an intrusion by the opening of a door.

A second remaining important object of the invention is to provide a vehicle surveillance system that begins video recording of an interior of a vehicle when the system is armed upon detection of an intrusion by the activation of a dome light.

Briefly, a vehicle surveillance system that is constructed in accordance with the principles of the present invention has a device for recording video images, for example a video cassette recorder (VCR) and a camera that is adapted to view the interior of the vehicle. The VCR is off when the vehicle is running (i.e., when the key is on). When the vehicle is turned off and the doors are locked (or after a predetermined time), the system is armed. In the armed state the VCR does not record but is set to record the images seen by the camera upon activation. Activation occurs upon the detection of an unauthorized intrusion, for example by the dome light turning on, a door opening, a sensor detecting a presence in the vehicle, all of which are absent a disarming of the system first occurring such as by an unlocking of the doors.

DETAILED DESCRIPTION OF THE INVENTION

Figure 1:
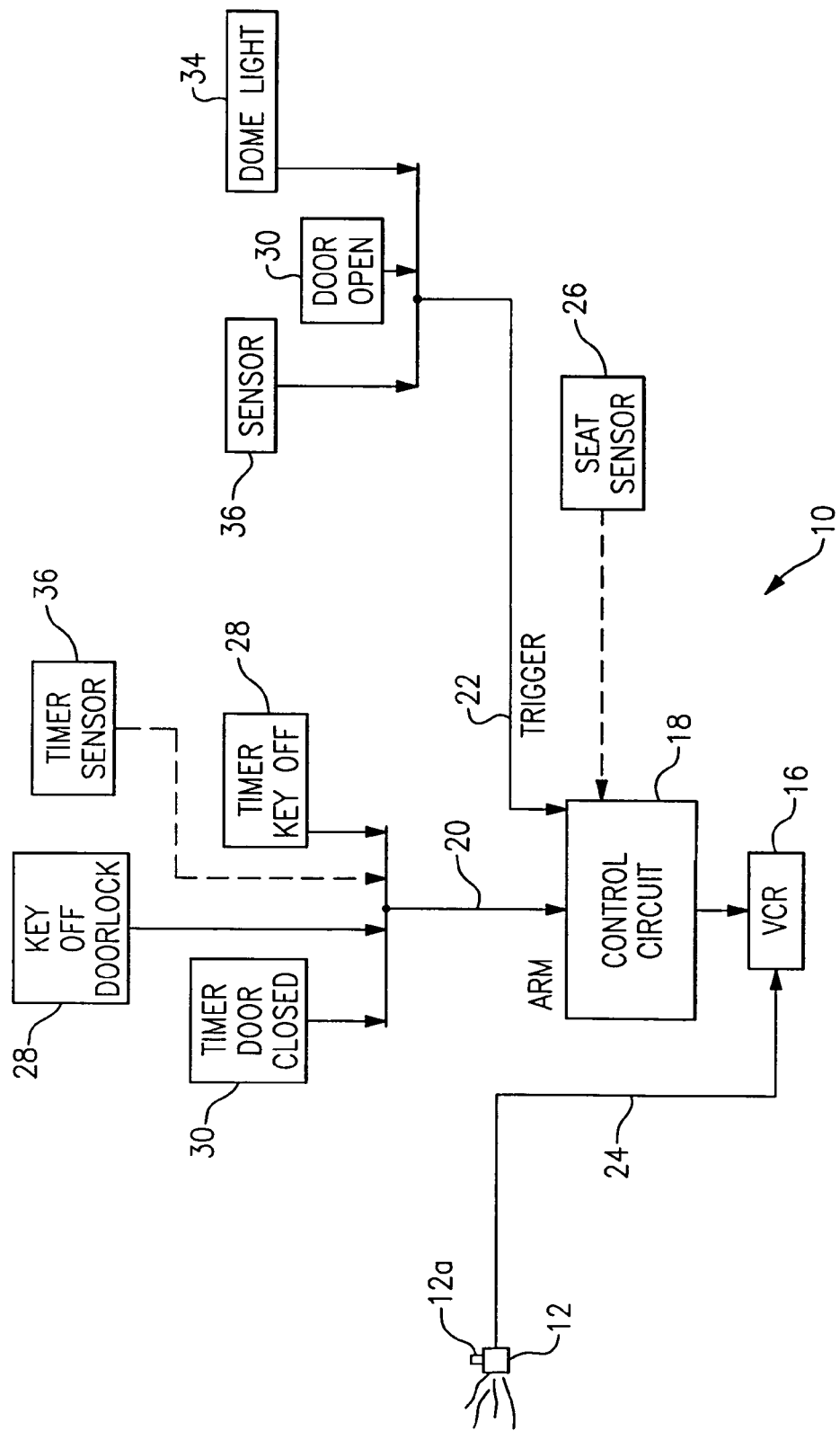
FIG. 1 is a block diagram of a vehicle surveillance system.
Figure 2:
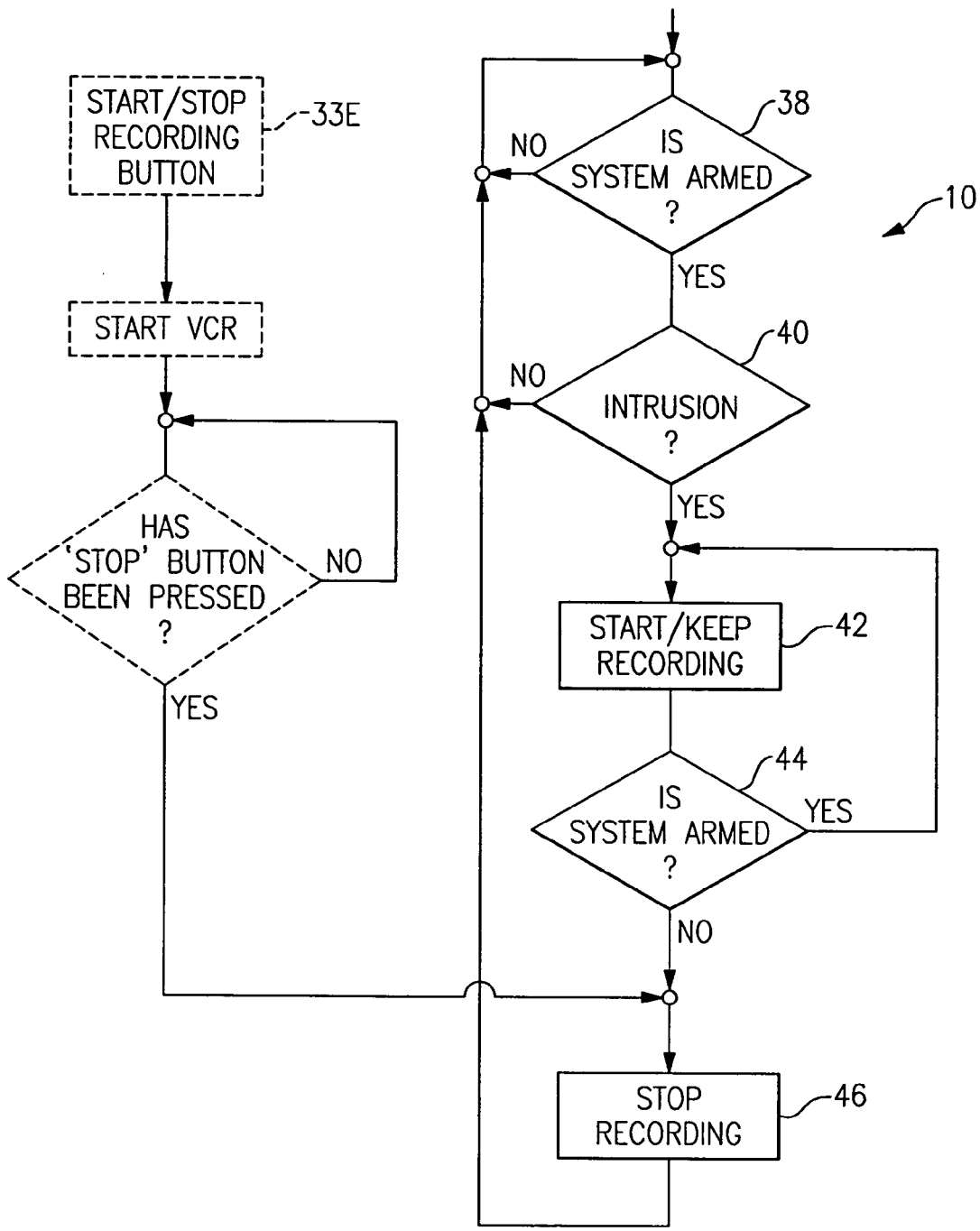
FIG. 2 is a flow chart of the vehicle surveillance system of FIG. 1.
Figure 3:
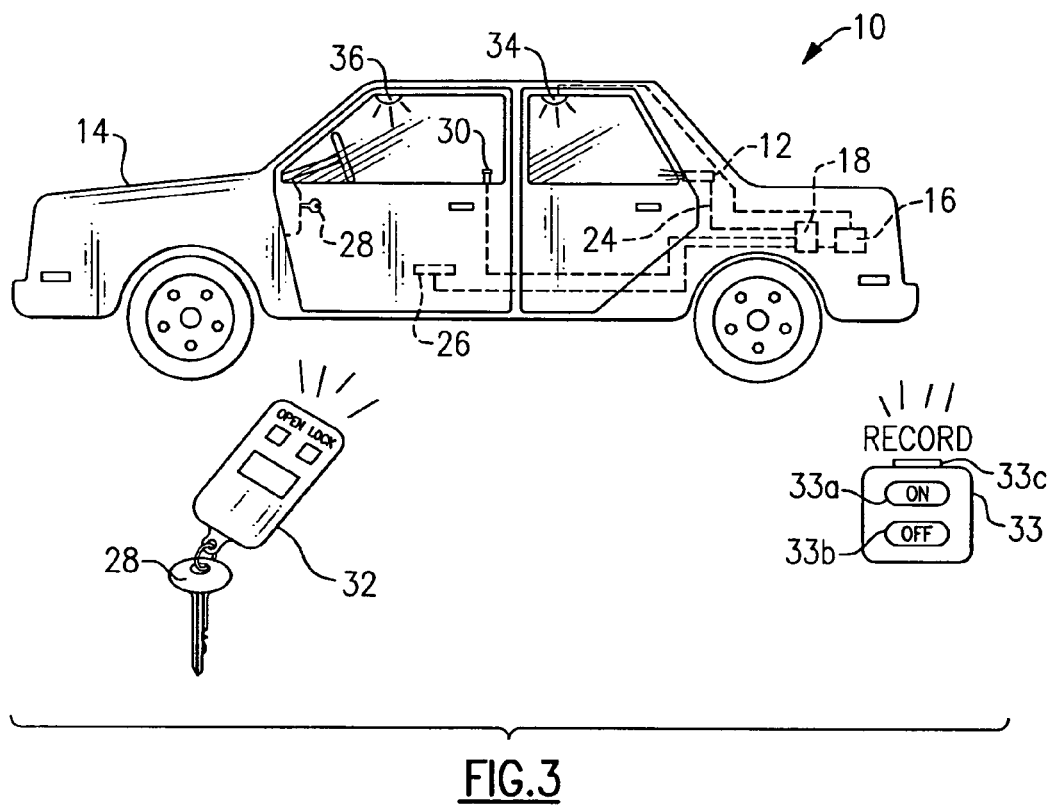
FIG. 3 is a diagrammatic view of the vehicle surveillance system in a vehicle.

Referring to FIGS. 1, 2, and 3 is shown, a vehicle surveillance system, identified in general by the reference numeral 10.

A camera 12 is located where desired in the interior of a vehicle 14. The camera 12 supplies a real-time video image that is to be recorded, as is described in greater detail hereinafter. Any present or future method of storing the video images that are captured by the camera 12 may be used with the system 10, including digital storage. A preferred method includes the use of video cassette recorder 16 (hereinafter "the VCR 16"), as is well known in the video recording arts.

A control circuit 18 is used to control operation of the VCR 16. The control circuit 18 may include a microprocessor (not shown) or it may be hardwired, as desired, using either analog or digital electronic components. The control circuit 18 may be located proximate to the VCR 16 or remote therefrom, as desired.

The control circuit 18 receives an armed input indication 20 and an intrusion indication 22. The armed input 20 enables the system for recording but does not cause it to actually begin recording. When the armed input 20 is active (i.e., enabled) and the intrusion indication 22 is also activated, this event then becomes a trigger event that starts recording of the images of an interior portion of the vehicle 14.

Preferably, the camera 12 is disposed near the rear of the vehicle 14 and it includes a wide angle lens with sufficient resolution to record as much of the interior as possible. The camera 12 is as tiny and unobtrusive as possible. It is preferably located so as to provide a view of the vehicle's 14 interior and also it is desirable that it be hidden from view so that an intruder does not even know that he or she is being recorded. The camera 12 output is connected to the VCR 16 by a connecting cable 24.

The connecting cable 24 includes a wire or fiber optic connection or both, as desired, that is sufficient to convey the images captured by the camera 12 to the VCR 16.

A seat sensor 26 is an option (shown in dashed lines in FIG. 2) and is used to indicate to the control circuit 18 whether or not a driver (not shown) is present in the driver's seat of the vehicle 14. This is described in greater detail hereinafter.

A key 28 is shown in the ignition switch of the vehicle 14. A push button door lock 30 is used to manually lock or unlock the vehicle 14. A wireless remote control 32 for the vehicle 14 is also used to lock or unlock the vehicle 14. A duplicate of the key 28 is attached thereto.

A dome light 34 is mounted in the roof of the vehicle 14 and is illuminated when the doors are opened.

An optional motion sensor 36 is located wherever desired in the vehicle 14 and is used to detect entry into the vehicle.

Referring to a first decision 38 in the flow chart of FIG. 2, the question as to whether or not the system 10 is armed is asked. It the system 10 is not armed it is in a quiescent state.

There are a number of options available for arming the system 10. A preferred method is to use the remote 32 to lock the doors. Alternately, the key 28 may be used to lock the doors. The occurrence of either event is a condition sufficient to arm the system 10. This is because either activity indicates that the vehicle 14 is not in use and is to be unattended.

It is possible for a person to remain inside the vehicle 14 and use the remote 32 to lock the doors. This would also arm the system 10. The presumption here is that the person wishes to rest, perhaps take a nap, and that they want maximum safety while in the vehicle. If an intrusion were to occur under these conditions, then the system 10 would begin recording images of the interior of the vehicle 10 upon detection of an intrusion, as is described in greater detail hereinafter, which could help identify any possible intruder.

There are other possible ways to arm the system 10. For example, a timer (included in the first decision 38) would be used to arm the system a predetermined time after the doors were closed, for example one to five minutes thereafter. So as not to inadvertently arm the system 10 when the vehicle 14 is in use, the system 10 would also monitor another function as well, for example, whether or not the vehicle's 14 engine is running.

If the engine is not running and the doors have been closed for one to five minutes, then it can well be concluded that the vehicle 14 is not in use and that arming of the system 10 is warranted.

Alternately, another function to monitor is whether or not there is a driver present in the vehicle 14. For this, the seat sensor 26 may be used. If the seat sensor 26 indicates that a driver is sitting in the vehicle 14 and the timer has elapsed (i.e., from one to five minutes), then the system would not be armed. If however, the seat sensor 26 indicates that no one is sitting in the driver's seat, then the system would arm after the timer had elapsed.

It is also possible to arm the system 10 a predetermined period of time after the key 28 has been turned off, again from one to five minutes, for example.

If the motion sensor 36 is included as part of the system 10 and no movement has been detected by it for a predetermined period of time, it is also possible use this lack of motion information to arm the system 10. Again, the ignition being off or the seat sensor 26 revealing the absence of anyone may also be used as part of this arming criteria, as was previously described herinabove.

With many different types of vehicles, after exiting the vehicle 14 the dome light 34 will remain on for a period of time and then shut off. The turning off of the dome light 34 can also be used to arm the system 10, either with or without the use of an additional timer, and also with or without the monitoring of another function (i.e., key off, seat sensor 26 showing the absence/presence of a person).

The system 10 may also include its own wireless system remote 33. This is also preferable in that the system remote 33 can be used to silently arm and disarm the system 10 by pushing an arm button 33a, or disarm button 33b.

Another benefit provided by the system remote 33 is that it may include a start/stop recording button 33c that can be pressed to automatically and silently start recording images in the vehicle 14. If the owner of the vehicle 14 wants to record the contents or interior of the vehicle 14, for any reason, the start/stop button 33c is pressed once to begin recording and again to stop recording.

The use of the start/stop recording button 33c on the system remote 33c is shown in dashed lines in the flow chart. As can be seen, its use overrides the normal operating software of the system 10.

Once it is determined that the system 10 is armed, a second decision 40 appertains to whether or not an intrusion has occurred while the system 10 is armed.

If no intrusion has been detected and the system 10 is armed, then it sits in a quiescent mode not recording images (unless of course the start/stop button 33c has been pressed). The loop repeats waiting for either an intrusion to be detected or for the system 10 to be disarmed by either a normal unlocking of the doors by the key 28 or by unlocking the doors via the remote 32 or by pressing the disarm button 33b of the system remote 33.

If however the system 10 remains armed and an intrusion is detected, the VCR 16 will begin recording images as observed by the camera 12 under the first operation block 42 of the flow chart.

The system 10 will keep recording until either a tape in the VCR 16 is filled or the system 10 is disarmed by any method mentioned hereinabove as determined by a third decision 44. Once the system 10 has been disarmed, a second operation block 46 instructs the VCR 16 to stop recording images.

These recorded images can be used by law enforcement personnel for criminal identification and apprehension, by the judicial system for prosecution, and by insurance companies for verification purposes of the contents of the vehicle 14 as well.

Intrusion can be determined by a variety of conditions. For example, if the dome light 34 illumines while the vehicle 14 is locked (i.e., while the system 10 is still armed), then an intrusion can be concluded to have occurred. If the door lock 30 is opened from the inside while the system 10 is still armed, an intrusion can be concluded. If the motion sensor 36 detects a presence while the system 10 is armed or if the seat sensor 26 detects a presence, all of these conditions can be used to indicate an intrusion.

It is preferable for as much of the entire system 10 as possible to be hidden from view, for example in the trunk of the vehicle 14. Not only does this make detection more difficult, but it prevents tampering with the system's 10 recorded images (i.e., if the presence of the system 10 is not known).

Figure 4:
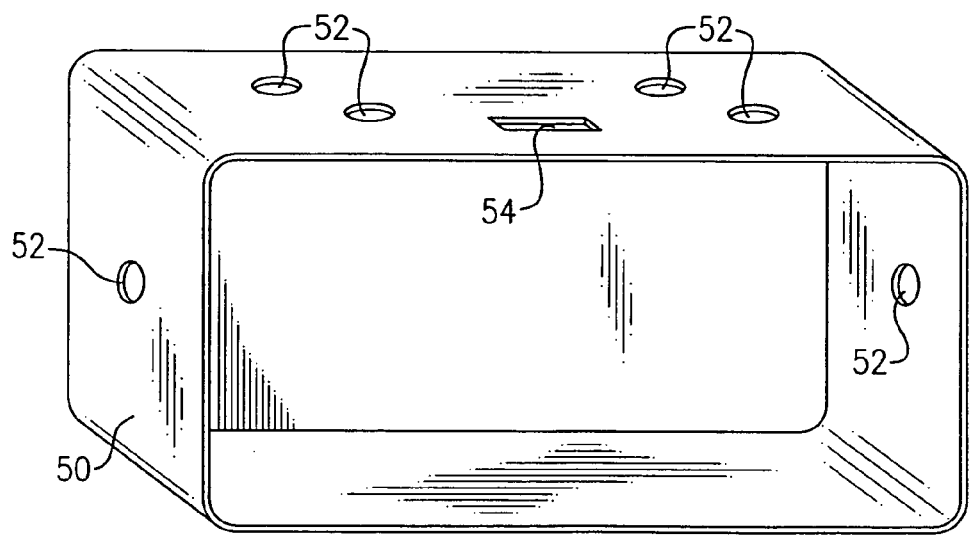
FIG. 4 is a view in perspective of a mounting cage.
Figure 6:
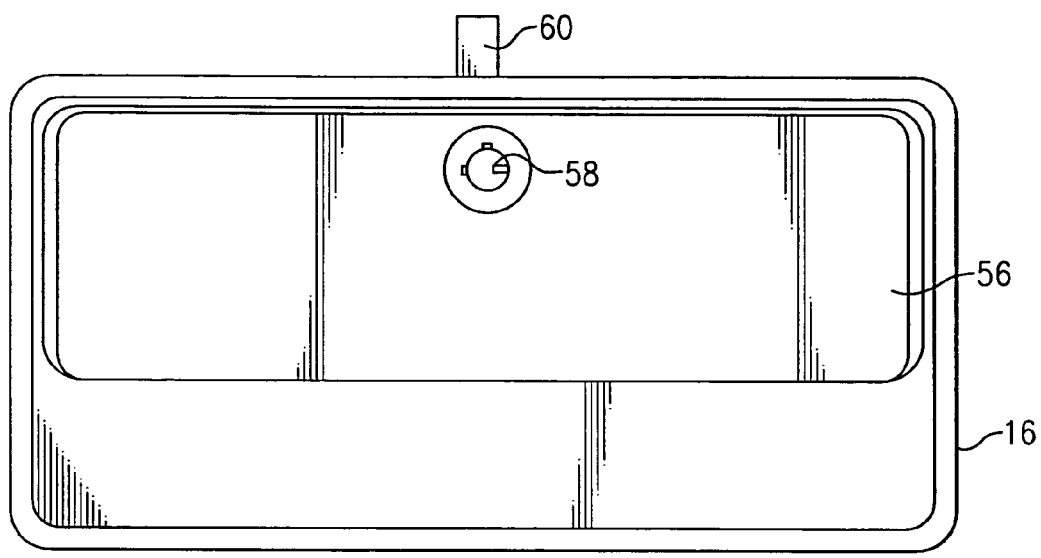
FIG. 6 is a plan view of the front of the VCR of FIG. 5 with the door in a closed position.
Figure 5:
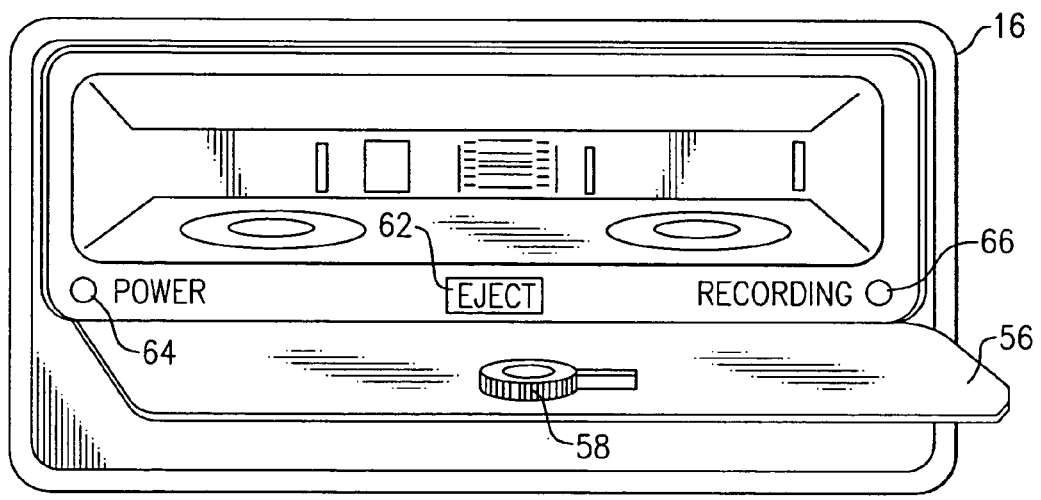
FIG. 5 is a view in perspective of a front of a VCR with an access door open.

Referring now also to FIGS. 4–6, t is also preferable to make the tape and the VCR 16 as secure as possible. To do this, a mounting cage 50 is securely fastened in the vehicle's 14 interior, preferably in the trunk. Screws or bolts (not shown) pass through holes 52 in the mounting cage 50. The mounting cage 50 acts as a sleeve that is adapted to detachably receive the VCR 16, as is described in greater detail hereinafter.

A slot 54 is provided through a top of the mounting cage 50.

Referring to FIGS. 5 and 6, the VCR 16 preferably includes a faceplate (access door) 56 that includes a key lock 58. The key lock 58 includes a tab 60 that is displaced to the side when the faceplate 56 is opened (as shown in FIG. 5) and faces upwards (FIG. 6) when the faceplate 56 is secured in the locked (i.e., closed) position.

To insert the VCR 16 into the mounting cage 50 the tab 60 is sideways and the VCR 16 is slid into the cage 50. Once it is in position, the key lock 58 is urged so as to rotate the tab 60 upwards where it passes through the slot 54 in the cage 50 thereby securing the VCR 16 in the cage 50 and also securing the faceplate 56 in a closed position, thereby preventing any intruder from removing either the VCR 16 or tape that is disposed under the faceplate 56.

To remove the tape the key lock 58 is opened, the faceplate 56 is opened, and an eject button 62 is pressed. The VCR 16, along with the tape may also be removed from the cage 50, if desired.

A power light 64 and a recording light 66 are covered when the faceplate 56 is closed so as to better prevent detection of the system 10 by an intruder.

If desired, the mounting cage 50 can be made as sturdy as desired, so as to resist prying.

The camera 12 may also include a microphone 12a to detect and permit the recording of sounds, including speech. This may also be useful in the identification and prosecution of an intruder.

It is also important to note that recording of the images occurs discreetly. No audible sound or indication of recording is provided to anyone inside the vehicle 14 so as not to alert an intruder. Accordingly, this is yet another reason to locate the VCR 16 in the trunk where its operation cannot be heard. Soundproofing may also be added around the mounting cage 50 for this purpose.

Of course, the VCR 16 is preferably designed to operate on twelve volts DC, as is commonly found in most vehicles 14.

Other modifications are also possible, for example the camera 12 may include a variety of lenses that can be added or removed to change the field of view as desired. For example, if the vehicle 14 is a compact car, a small field of view may be preferable whereas a larger field of view is desirable for use with larger types of vehicles 14. The vehicle 14 may include a delivery truck, for example, as well as any passenger type of car.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A vehicle surveillance system, comprising:
    (a) means for recording a video image, said means including a video cassette recorder;
    (b) means for arming said system sufficient to enable the recording of said video image subsequent to the detection of an event;
    (c) means for detecting an intrusion into said vehicle; and wherein said means for recording a video image includes a video cassette recorder and a mounting cage that is adapted to receive said video cassette recorder, said mounting cage attached to said vehicle, and wherein said video cassette recorder includes an access door over an opening adapted to receive a video cassette tape, and wherein said access door includes a key lock and wherein said key lock includes a tab that is adapted to pass through an opening provided in said mounting cage when said video cassette recorder is disposed in said mounting cage and said key lock is urged into a locking position and wherein said tab is adapted to prevent both the removal of said video cassette recorder from said mounting cage and to also prevent the removal of said video cassette tape from said video cassette recorder;

whereby a detection of an intrusion by said means for detecting an intrusion is adapted to provide said event sufficient to enable said system to record said video image.

2. The video surveillance system of claim 1 wherein said means for recording a video image includes a camera disposed in said vehicle, said camera adapted to view at least a portion of an interior of said vehicle.

3. The video surveillance system of claim 1 wherein said means for recording a video image includes means for storing said video image.

4. The video surveillance system of claim 3 wherein said means for storing said video image includes a video cassette recorder.

5. The video surveillance system of claim 4 wherein said video cassette recorder includes a video cassette tape that is adapted to cooperate with said video cassette recorder sufficient to record said video image upon said video cassette tape.

6. The video surveillance system of claim 1 wherein said means for arming said system includes means for determining that said vehicle is not in use.

7. The video surveillance system of claim 6 wherein said means for determining that said vehicle is not in use includes detection of a locking of all doors of said vehicle by a key.

8. The video surveillance system of claim 6 wherein said means for determining that said vehicle is not in use includes detection of a locking of all doors of said vehicle by a remote control of said vehicle.

9. The video surveillance system of claim 6 wherein said means for determining that said vehicle is not in use includes detection of a closing of all doors of said vehicle followed by the elapsing of a sufficient amount of time when said vehicle is not in motion.

10. The video surveillance system of claim 9 wherein said sufficient amount of time is greater than one minute and less than five minutes.

11. The video surveillance system of claim 6 wherein said means for determining that said vehicle is not in use includes detection of a turning off of an ignition key of said vehicle followed by the elapsing of a sufficient amount of time.

12. The video surveillance system of claim 11 wherein said sufficient amount of time is greater than one minute and less than five minutes.

13. The video surveillance system of claim 6 wherein said means for determining that said vehicle is not in use includes detection of the absence of a person disposed in a driver seat of said vehicle followed by the elapsing of a sufficient amount of time when said vehicle is not in motion.

14. The video surveillance system of claim 6 wherein said means for determining that said vehicle is not in use includes detection of the turning off of a dome light of said vehicle when said vehicle is not in motion.

15. The video surveillance system of claim 6 wherein said means for determining that said vehicle is not in use includes the absence of detection of motion by a motion sensor in said vehicle followed by the elapsing of a sufficient amount of time when said vehicle is not in motion.

16. The video surveillance system of claim 1 wherein said means for detecting an intrusion includes turning on of a dome light in said vehicle when said system is armed.

17. The video surveillance system of claim 1 wherein said means for detecting an intrusion includes opening of a door in said vehicle when said system is armed.

18. The video surveillance system of claim 1 wherein said means for detecting an intrusion includes detection of motion in said vehicle by a motion sensor that is disposed in said vehicle when said system is armed.

19. A method of recording video images of a portion of an interior of a vehicle that is not in use, comprised of the steps of:
(a) providing means for recording a video image in said vehicle, said means including a video cassette recorder;
(b) providing means for arming said system sufficient to enable the recording of said video image subsequent to the detection of an event;
(c) providing means for detecting an intrusion into said vehicle;
(d) recording said video image subsequent to detecting an intrusion by said means for detecting an intrusion; and
(e) providing a mounting cage that is adapted to receive said video cassette recorder, said mounting cage attached to said vehicle, and wherein said video cassette recorder includes an access door over an opening adapted to receive a video cassette tape, and wherein said access door includes a key lock and wherein said key lock includes a tab that is adapted to pass through an opening provided in said mounting cage when said video cassette recorder is disposed in said mounting cage and said key lock is urged into a locking position and wherein said tab is adapted to prevent both the removal of said video cassette recorder from said mounting cage and to also prevent the removal of said video cassette tape from said video cassette recorder.

20. A vehicle surveillance system, comprising:
(a) means for recording a video image;
(b) means for arming said system sufficient to enable the recording of said video image subsequent to the detection of an event;
(c) means for detecting an intrusion into said vehicle;
(d) wherein said means for arming said system includes means for determining that said vehicle is not in use prior to an arming of said system and wherein said means for determining that said vehicle is not in use includes the absence of detection of motion by a motion sensor in said vehicle followed by the elapsing of a sufficient amount of time when said vehicle is not in motion; and
whereby a detection of an intrusion by said means for detecting an intrusion is adapted to provide said event sufficient to enable said system to record said video image.

* * * * *